United States Patent [19]

O'Brian et al.

[11] 4,109,933
[45] Aug. 29, 1978

[54] FOLDING WHEELBARROWS

[76] Inventors: Edward D. O'Brian, 910 Iroquois, Anaheim, Calif. 92801; William M. Plachy, 3353 San Marcos Blvd., San Marcos, Calif. 92069

[21] Appl. No.: 786,833

[22] Filed: Apr. 12, 1977

[51] Int. Cl. ................................................. B62b 1/20
[52] U.S. Cl. .................................................... 280/653
[58] Field of Search ...................... 280/653, 652; 220/6

[56] References Cited
U.S. PATENT DOCUMENTS

| 1,145,523 | 7/1915 | Thompson | 280/653 |
| 2,471,462 | 5/1949 | Toth | 280/653 |
| 3,722,904 | 3/1973 | Puckett | 280/653 |

Primary Examiner—Robert R. Song

[57] ABSTRACT

A folding wheelbarrow can be constructed so as to utilize a wheelbarrow body which is adapted to be folded or manipulated from a normal position into a folded position. Such a body is attached to a wheel support serving to carry a normal wheel and handles. In order to achieve a satisfactory folding action each such body is constructed so as to have a bottom wall including at least two bottom panels, a front wall having at least two front wall panels and sides connected by the bottom wall panel and the front wall panel. A plurality of separate linkage hinges connect the bottom and front wall panels and the sides so as to permit Sarrus-type motion of the panels and the sides during manipulation of the body from a normal position into a folded position. A latch or latch-type structure is preferably used to connect at least two parts which pivot relative to one another during such folding so as to hold the body in its normal position.

10 Claims, 10 Drawing Figures

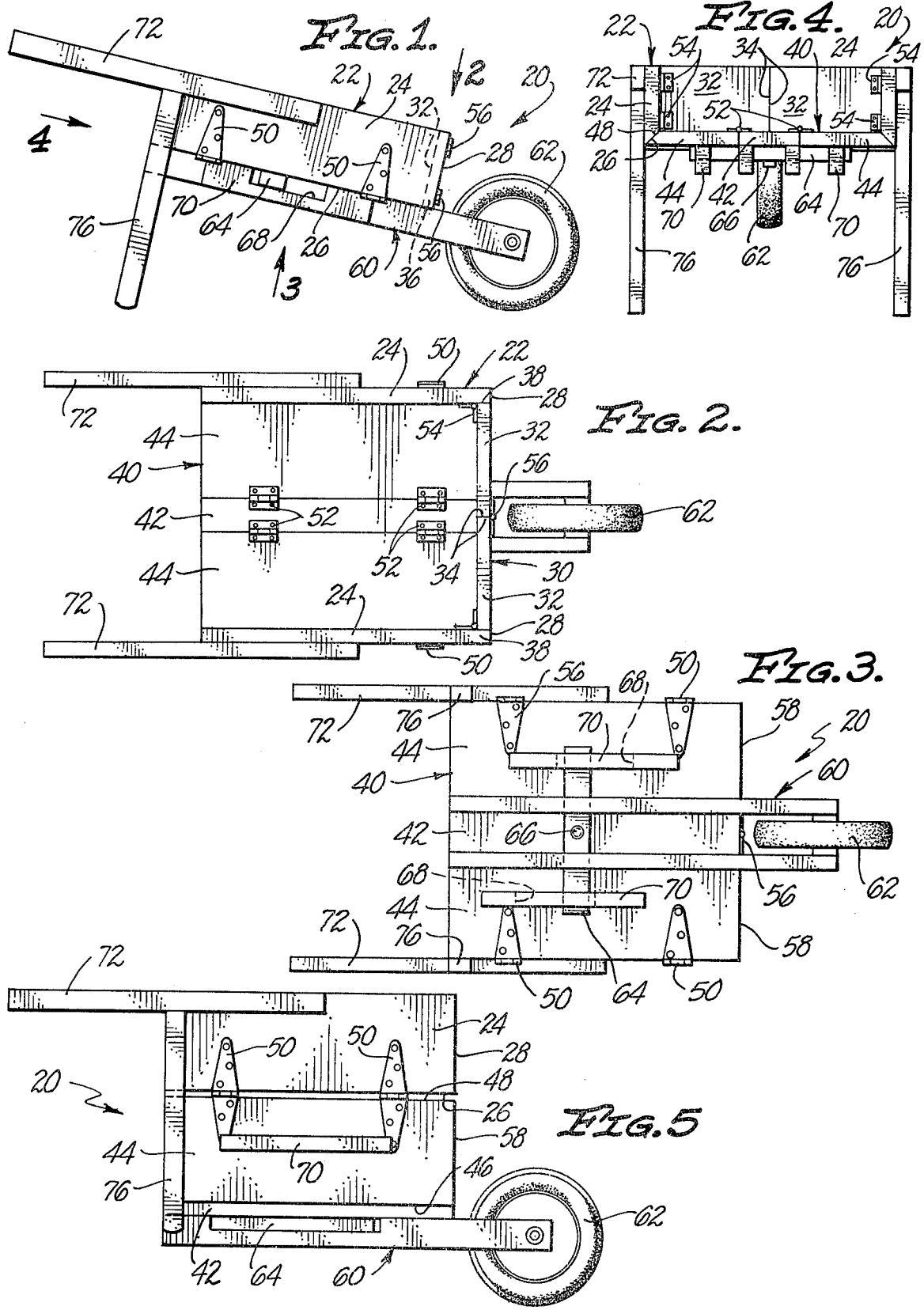

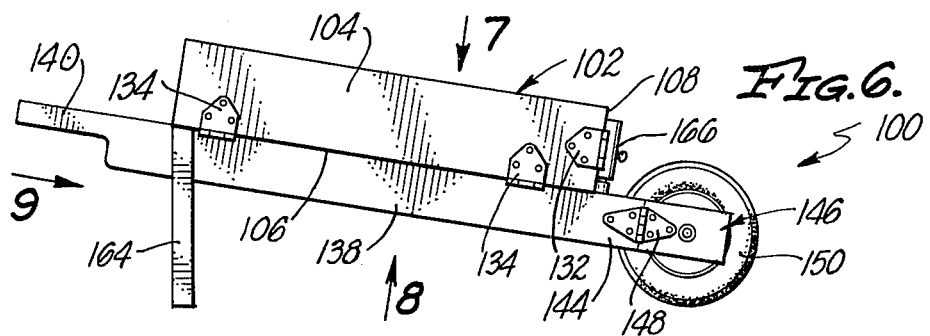
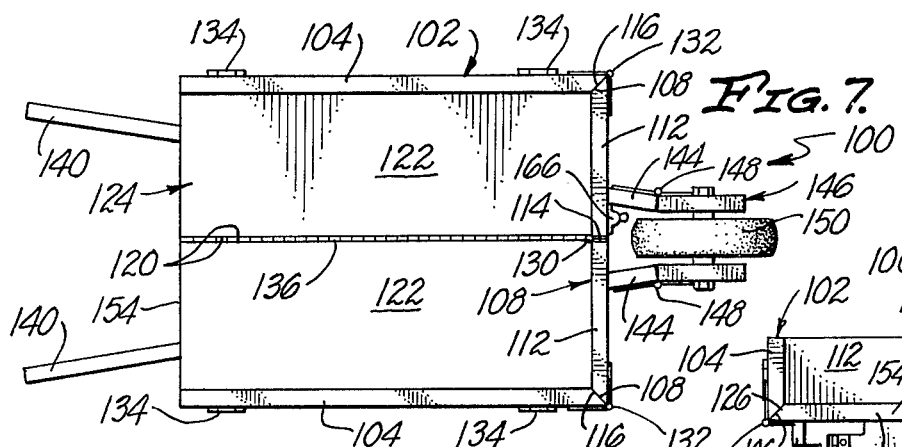
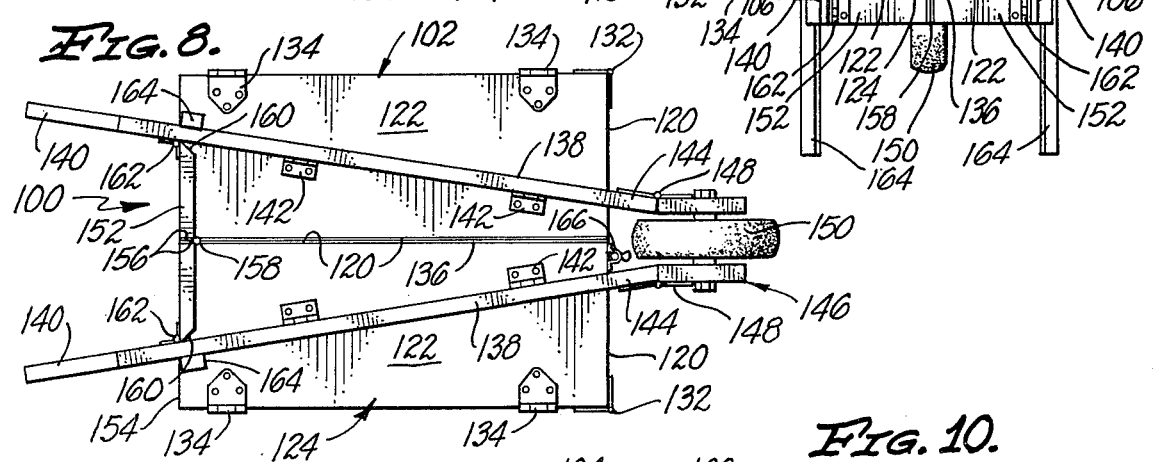
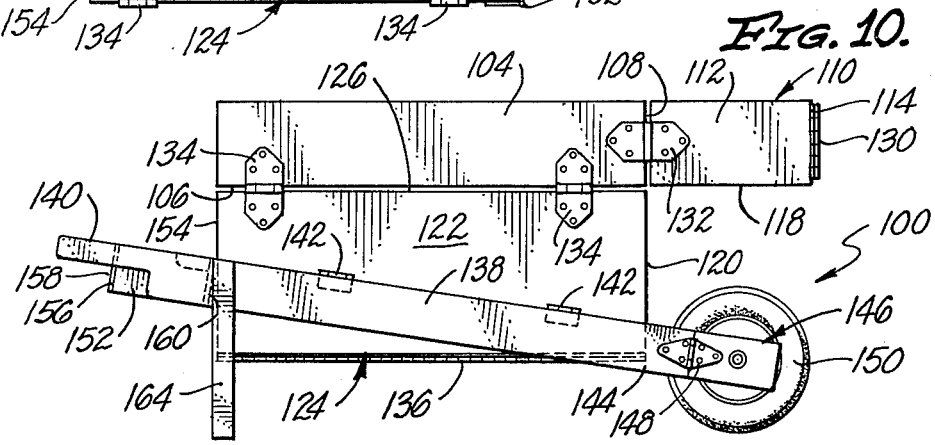

FOLDING WHEELBARROWS

CROSS-REFERENCE TO RELATED APPLICATIONS

In a sense the subject matter of this application is related to the following copending applications:

Application Ser. No. 752,104, filed Dec. 20, 1976, entitled "FOLDABLE STRUCTURES CONSIDERED TO BE PRIMARILY USEFUL AS DOG-HOUSES," by the inventors named herein;

Application Ser. No. 786,844, filed Apr. 12, 1977, entitled "FOLDING STRUCTURES CONSIDERED TO BE PRIMARILY USEFUL FOR PLAY PURPOSES," by the inventors named herein;

Application Ser. No. 786,832, filed Apr. 12, 1977, entitled "FOLDING STRUCTURES USEFUL AS TWO-WHEELED CARTS," by the inventors named herein; and Application Ser. No. 786,824, filed Apr. 12, 1977, entitled "FOLDING, RIGID TENT-LIKE STRUCTURE," by the inventors named herein.

In the interest of brevity the entire disclosures in each of these copending applications is incorporated herein by reference.

BACKGROUND OF THE INVENTION

The invention set forth in this specification pertains to new and improved folding wheelbarrows. It is considered that the wheelbarrows of the present invention are primarily useful by children in connection with play activities.

It has long been recognized that conventional wheelbarrows are highly useful for both utilitarian and play purposes. It has long been recognized that in many instances it is desirable to have folding wheelbarrows since conventional wheelbarrows are rather bulky devices which are difficult to store when they are not in use. This latter recognition has resulted in the development of a number of different collapsible or foldable wheelbarrow structures. It is not considered that a detailed understanding of the present invention requires a detailed analysis of such prior structures. Although unquestionably such prior structures have been of a utilitarian character in general they have been disadvantageous or undesirable to a degree for one or more of a series of more or less related reasons.

Frequently such structures have been unnecessarily complex and expensive to construct. Certain of such foldable or collapsible wheelbarrows have required the use of specialized joints or connectors such as are not conveniently available. Other of such structures have utilized folding actions which have not permitted the operative parts of a wheelbarrow to be fully connected in both folded and an unfolded or normal configuration. The latter is considered to be reasonably important since if all of the parts of a wheelbarrow are always connected in an operative manner the barrow itself is simpler to use than if a user has to secure various parts together to manipulate the wheelbarrow between folded and unfolded positions.

SUMMARY OF THE INVENTION

As a result of these considerations it is considered that there is a need for new and improved folding wheelbarrows. A broad objective of the present invention is to fulfill this need. Further objectives of the present invention are to provide folding wheelbarrows which are of such a character that they can be easily and conveniently constructed in an average or common workshop at a comparatively nominal cost, which are of such a character that all of the parts of such wheelbarrows are permanently secured together in an operative manner in both normal and folded positions of such wheelbarrows, which utilize conventionally available materials and parts, which can easily and conveniently be manipulated between folded and unfolded positions, and which are satisfactory for use as wheelbarrows for play and utilitarian purposes.

In accordance with this invention these various objectives are achieved by providing a wheelbarrow having a body, a wheel support, a wheel and handle means, said body including a bottom wall having front and rear ends and side edges, side walls extending upwardly from said side edges of said bottom wall, a front wall extending upwardly from the front end of said bottom wall and extending between said side walls, said wheel support being attached to said body so as to extend in front of said body, said wheel being rotatably mounted on said wheel support, said handle means being attached to said body so as to extend to the rear of said body in which the improvement comprises: said bottom wall including at least two bottom wall panels having adjacent edges which are located next to one another between said side edges of said bottom wall, said front wall comprising at least two front wall panels having adjacent edges located adjacent to one another between said side edges of said front wall, a plurality of separate linkage hinge means connecting panels of said bottom walls of one another, connecting panels to said bottom walls to said side walls, connecting said side walls to panels of said front walls and connecting panels of said front wall together, said linkage hinge means being located so as to permit Sarrus motion of said panels of said bottom and front walls and said side walls so that said body may be manipulated from a normal position into a folded position in which said side walls are located adjacent to one another, and manually operable latch means for securing parts connected by at least one of said hinge means against folding so as to prevent said body from being folded from said normal position into said folding position.

BRIEF DESCRIPTION OF THE DRAWINGS

The invention is best more fully explained with reference to the accompanying drawings in which:

FIG. 1 is a side elevational view of a presently preferred embodiment or form of a wheelbarrow in accordance with the invention in an unfolded position or configuration;

FIG. 2 is a top plan view of the wheelbarrow shown in FIG. 1 taken in the direction of the arrow 2 in FIG. 1;

FIG. 3 is a bottom plan view of a wheelbarrow shown in FIG. 1 taken in the direction of the arrow 3 in FIG. 1;

FIG. 4 is a rear elevational view of the wheelbarrow shown in FIG. 1 taken in the direction of the arrow 4 in FIG. 1;

FIG. 5 is a side elevational view of the wheelbarrow shown in FIG. 1 in a folded position or configuration;

FIG. 6 is a side elevational view of a modified embodiment or form of a wheelbarrow in accordance with the invention in an unfolded position or configuration;

FIG. 7 is a top plan view of the wheelbarrow shown in FIG. 6 taken in the direction of the arrow 7 in FIG. 6;

FIG. 8 is a bottom plan view of the wheelbarrow shown in FIG. 6 taken in the direction of the arrow 8 in FIG. 6;

FIG. 9 is a rear elevational view of the wheelbarrow shown in FIG. 6 taken in the direction of the arrow 9 in FIG. 6; and FIG. 10 is a side elevational view of the wheelbarrow shown in FIG. 6 in a folded position or configuration.

The particular wheelbarrows illustrated were designed primarily for use by children for play purposes. Obviously many changes can be made in the particular wheelbarrows shown through the use or exercise of routine design skill in providing wheelbarrows of the same or somewhat different design for different uses. Because of this the invention is not to be considered as being limited to the precise wheelbarrows illustrated, but instead is to be considered as being limited solely by the appended claims forming a part of this specification.

DETAILED DESCRIPTION

In FIGS. 1 to 5 of the drawings there is shown a wheelbarrow 20 which is constructed so as to include a body 22. Technically this body 22 may be referred to as a barrow. It is constructed so as to include opposed parallel side walls 24 having bottom edges 26 and front edges 28. This body 22 also includes a front wall 30 consisting of two bilaterally symmetrical front wall panels 32 having adjacent edges 34, bottom edges 36 and side edges 38. This body 22 also includes a bottom wall 40 constructed to include a connecting bottom wall panel 42 and two other bottom wall panels 44. The connecting wall panel 42 and the panels 44 have adjacent edges 46 and the panels 44 have side edges 48.

Within the body 22 the bottom edges 26 of the side walls 24 are located adjacent to and are connected to the side edges 48 of the panels 40 by means of linkage hinges 50. Other linkage hinges 52 are utilized to connect the edges 46 of the panels 42 and 44. A further set of linkage hinges 54 is utilized to connect the front edges 26 of the side walls 24 to the side edges 38 of the front wall 30. The adjacent edges 34 of the front wall 30 are connected by another set of linkage hinges 56. The bottom edges 36 of the panels 32 are unattached to the bottom wall 40 but are located so as to be closely adjacent to front edges 58 of the panels 42 and 44 when a wheelbarrow 20 is in a normal position as indicated in FIGS. 1 to 4.

The various hinges 50, 52, 54 and 56 are all located relative to one another so as to permit a type of Sarrus motion enabling the entire body 22 to be folded from such a normal position as shown in FIG. 1 into a folded position or configuration as indicated in FIG. 5. Because Sarrus motion is well known it is not considered necessary to specifically describe it in this specification. This type of motion is explained in the section entitled "Sarrus' Motion" commencing on page 236 of the text *Mathematical Models* by Crundy, et al., second edition, 1961, copyright Oxford University Press. It will of course be realized that in order to obtain a Sarrus type of folding action that the dimensions of the various parts connected together by the hinges noted must be related in a conventional manner in order to permit folding.

It will be realized that various hinges described can be located so as to have sets of axes meeting at a common point or so as to have axes which are parallel to one another in achieving Sarrus motion. The use of sets of hinges having axes meeting at a common point is desirable in providing other than a rectilinear appearance in a wheelbarrow such as the wheelbarrow 20. However, it is considered that normally the construction of a wheelbarrow 20 will be facilitated utilizing sets of hinges having parallel axes. This, of course, results in the wheelbarrow 20 having a box-like rectilinear appearance.

In the particular body 22 illustrated the hinges 50 and 52 are disposed so as to have parallel axes and the hinges 54 and 56 are also disposed so as to have axes which are parallel to one another. In this body 22 the panels 44 are of corresponding dimension and are bilaterally symmetrical on each side of the connecting wall panel 42. This panel 42 is of such dimension between the two panels 44 as to accommodate the front wall panels 32 when the body 22 is in a folded position or configuration so that such panels 32 are parallel to one another and are located generally between and parallel to the side walls 24.

The wheelbarrow 20 also includes a framework 60 serving as a wheel support. This framework 60 is attached to the connecting wall panel 42 so as to extend past the front edges 58 generally in front of the front wall 30. A conventional wheel 62 is mounted on the framework 60 in a conventional manner. This framework 60 is also utilized to support and to pivotally mount a cross-bar 64 so that this cross-bar 64 can be pivoted about a pivot pin 66 between a position as shown in FIG. 5 and a position as shown in FIG. 3. When the wheelbarrow 20 is folded the cross-bar 64 lies generally along and parallel to the connecting wall panel 42. When the wheelbarrow 20 is in its normal position the cross-bar 64 extends transverse to the connecting wall panel 42 generally parallel to the bottom wall panels 44 and is engaged within notches 68 in retainers 70 secured to the bottom wall panels 44.

When the cross-bar 64 is in this normal position it secures the panels 44 so that they cannot pivot relative to the connecting wall panel 42. Because of the nature of Sarrus motion or action this automatically secures the entire body 22 against folding. In effect the cross-bar 64 and the retainer 70 act as "latch means" securing the body 22 against folding from the normal position into the folded position. Other equivalent latches securing any two parts of the body 22 which fold relative to one another against folding can be employed with the construction shown. The cross-bar 64 is considered preferable because of its simplicity, effectiveness, and because it tends to support the bottom wall 40 against sagging.

The wheelbarrow 20 also includes handles 72 which are attached to the side walls 24 so as to extend past the rear edges of the panels 42 and 44. These handles 72 can also be mounted on the bottom wall panels 44. However, it is preferred to mount them on the side walls 24 so that they will not abut against legs 76 mounted on the side walls 24 as the body 22 is manipulated into a folded position. These legs 76 extend downwardly from the side walls 24 in order to support the body 22. As the body 22 is folded the legs 76 fit against the bottom wall panels 44 in a convenient, relatively out of the way location.

In FIGS. 6 through 10 of the drawings there is shown a modified wheelbarrow 100 which includes a body or barrow 102 which is also constructed so as to be capable of folding in accordance with Sarrus' motion. This body 102 includes parallel, rectilinear side walls 104 having bottom edges 106 and front edges 108. The front edges 108 are connected together by a front wall 110 consisting of two bilaterally symmetrical front wall panels 112 having adjacent edges 114 and side edges 116 located adjacent to the front edges 108. These panels 112 also have bottom edges 118 which are located adjacent to front edges 120 of bottom wall panels 122 of a bottom wall 124. This bottom wall 124 extends between the bottom edges 106 of the side walls 104 with the bottom edges 106 of the sides walls 104 being located adjacent to side edges 126 of the panels 122. These panels 122 are bilaterally symmetrical and have adjacent edges 128 between the side edges 126.

The body 102 is completed through the use of linkage hinges 130 connecting the adjacent edges 114 of the front wall panels 112. Other linkage hinges 132 connect the side edges 116 of the front wall panels 112 to the front edges 108 of the side walls 104. Further linkage hinges 134 are utilized to connect the bottom edges 106 of the side walls 104 relative to the side edges 126 of the bottom wall panels 122. The adjacent edges 120 of the panels 122 are secured together through the use of other linkage hinges 136. These hinges 130, 132, 134 and 136 are arranged as indicated so as to permit the body 102 to be folded between a normal position as shown in FIGS. 6 through 9 and a folded position as indicated in FIG. 10.

The folding action employs the well known Sarrus motion referred to in the preceding discussion. In the particular embodiment of the body 102 illustrated the hinges 134 and 136 are parallel to one another while the hinges 130 and 132 are also parallel to one another. It will, of course, be realized that non-parallel hinges can be utilized in connection with a Sarrus motion linkage. This may be desirable if it is desired to utilize sloping walls in the body 102.

The wheelbarrow 100 also includes two elongated members 138 having ends 140 which are adapted to be utilized as handles. These members 138 are connected to the bottom wall panels 122 by means of hinges 142 so that in a normal position of the wheelbarrow 100 they extend vertically and downwardly from the bottom wall panels 122 and so that in the folded position they extend parallel to the bottom wall panels 122. These members 138 also have ends 144 which are located generally in front of the front wall 110. A yolk type wheel support 146 is secured to these ends 144 by means of hinges 148 having parallel pivot pins (not separately numbered). This wheel support 146 carries a conventional wheel 150 in an established manner. It is unattached to the bottom wall 124 and is carried solely by the members 138.

It is considered quite desirable to utilize with the wheelbarrow 100 latch means (not separately numbered) for maintaining the members 138 so that they remain parallel to one another at all times during unfolding and folding of the wheelbarrow 100 and for holding the body 102 in a normal, open position. Such means includes two toggle links 152 which are located so as to extend generally along and underneath rear edges 154 of the bottom wall panels 122 when the body 102 is in its normal position. These toggle links 152 have adjacent edges 156 which are connected by hinges 158 and ends 160 connected by further hinges 162 to the members 138. The axes of the hinges 158 and 162 are all parallel to one another. These links 152 are located in this manner so that they will be folded next to one another generally between the members 138 as the body is folded.

When the body is unfolded to a normal position these links 152 may be "snapped" to an overcenter position underneath the rear edges 154 in which they support the bottom wall 124 against sagging. In order to achieve this overcenter toggle type action the lengths of the links 152 must be related to the geometry employed in connection with the mounting of the members 138 so that there will be a temporary deformation somewhere in the system—i.e., in the links 152 and/or in the members 138 or in connection with various parts attached to these members 138 which will serve to lock the links 152 so that they are aligned with one another.

In the wheelbarrow 100 the members 138 serve to support the bottom wall panels 122 so as to prevent them from sagging. They also serve the function of carrying legs 164 used to support the body 102 in a conventional manner. These legs 164 are attached to the members 138 so as to extend downwardly from them. As the members 138 move relative to one another during folding these legs 164 are concurrently moved toward one another toward a flat, folded position.

It is considered rather surprising that a wheelbarrow 100 constructed so as to utilize members 138 attached as indicated in the preceding discussion to the body 102 and attached to the wheel support 146 as indicated will fold between a normal position as indicated in FIG. 6 and a folded position as indicated in FIG. 10. The reasons why this folding action can be achieved are not understood. However, wheelbarrows have been constructed which correspond to the wheelbarrow 100 and they do fold between the two positions indicated. It is considered possible that the normal "sloppiness" or "looseness" of commercially available hinges may play a part in the ability of a wheelbarrow such as the wheelbarrow 100 to fold between the two positions noted.

In order to complete the wheelbarrow 100 it is considered necessary to include legs 164 which are carried by and secured to the members 138 so as to extend downward from these members 138. It will be realized that during folding the legs 164 will move parallel to one another as the members 138 in effect pivot toward and away from one another. If desired a small barrel bolt type fastener 166 or similar mechanical latch may be used to connect at least one of the members 138 to one of the panels 112 to add rigidity to the entire structure. This is considered desirable in providing a mechanical latch so as to guard against accidental or unintentional folding of the wheelbarrow 100.

We claim:

1. A wheelbarrow having a body, a wheel support, a wheel and handle means, said body including a bottom wall having front and rear ends and side edges, side walls extending upwardly from said side edges of said bottom wall, a front wall extending upwardly from said front end of said bottom wall and extending between said side walls, said wheel support being attached to said body so as to extend to the front of said body, said wheel being rotatably mounted on said wheel support, said handle means being attached to said body so as to extend to the rear of said body in which the improvement comprises:

said bottom wall including at least two identical bottom wall panels having adjacent edges which are located next to one another between said side edges of said bottom wall, said front wall comprising at least two identical front wall panels having adjacent edges located next to one another between said side edges of said front wall, a plurality of separate hinge means connecting said panels of said bottom wall to one another, connecting said panels of said bottom wall to said side walls and connecting said side walls to said panels of said front wall and connecting said panels of said front wall together, said separate hinge means being located with respect to each other and said panels being dimensioned so as to permit Sarrus motion of said panels of said bottom and front walls and said side walls so that said body may be manipulated from a normal position into a folded position in which said side walls are located adjacent to one another, and manually operable latched means for securing parts connected by at least one of said hinge means against folding so as to prevent said body from being folded from said normal position into said folded position.

2. A wheelbarrow as claimed in claim 1 wherein:
said bottom wall includes a connecting bottom wall panel and two other bottom wall panels, said connecting bottom wall panel being located between and in edge-to-edge relationship with said other bottom wall panels when said body is in said normal position.

3. A wheelbarrow as claimed in claim 2 wherein:
said wheel support is secured to said connecting wall panel so as to extend therefrom beneath said front wall.

4. A wheelbarrow as claimed in claim 3 wherein:
said handle means comprises handles attached to said side so as to extend therefrom.

5. A wheelbarrow as claimed in claim 4 wherein:
said latch means includes a cross-bar pivotally mounted on said connecting bottom wall panel and retainers on parts of said body remote from said connecting wall panel, said retainers being located in positions in which they are capable of being engaged by said cross-bar when said body is in said normal position, said cross-bar being capable of being rotated out of engagement with said retainer so as to permit said body to be manipulated into said folded position.

6. A wheelbarrow as claimed in claim 1 wherein:
said bottom wall includes a connecting bottom wall panel and two other bottom wall panels, said connecting bottom wall panel being located between and in edge-to-edge relationship with said other bottom wall panels when said body is in said normal position, said wheel support is secured to said connecting wall panel so as to extend therefrom beneath said front wall, said handle means comprise handles attached to said sides so as to extend therefrom, legs attached to said side walls so as to fold therewith, and said latch means includes a cross-bar pivotally mounted on said connecting bottom wall panel and retainers on said other bottom wall panels, said retainers being located in positions in which they are capable of being engaged by said cross-bar when said cross-bar is rotated so as to extend from said bottom wall panel, said cross-bar being capable of being rotated out of engagement with said retainers into a position in which said cross-bar extends along and adjacent to said connecting wall panel.

7. A wheelbarrow as claimed in claim 1 wherein:
said handle means comprise two elongated members which extend along said bottom wall panels from adjacent to the front of said body to the rear of said body, a handle hinge means connecting each of said elongated members to one of said bottom wall panels, wheel support hinge means connecting each of said elongated members to said wheel support.

8. A wheelbarrow as claimed in claim 7 wherein:
said latch means comprise toggle means extending between said members, said toggle means serving to hold said member separate and apart to prevent folding of said body from said normal position into said folded position and being capable of being manipulated so as to permit such folding.

9. A wheelbarrow as claimed in claim 8 wherein:
said toggle means comprise two elongated links having adjacent ends pivotally connected to one another and having remote ends, each of which is pivotally connected to one of said elongated members, said links being connected to said members and to one another so as to pass through an over-center position in which an outward force is exerted on said members during actuation of said toggle means for securing said parts against folding.

10. A wheelbarrow as claimed in claim 1 wherein:
said handle means comprise two elongated members which extend along said bottom wall panels from adjacent to the front of said body to the rear of said body, a handle hinge means connecting each of said elongated members to one of said bottom wall panels, wheel support hinge means connecting each of said elongated members to said wheel support, and thereafter said wheel support being unattached to said body except as connected to said body through said elongated members, said bottom wall comprises two bottom wall panels, said latch means comprise toggle means extending between said members, said toggle means serving to hold said member separate and apart to prevent folding of said body from said normal position into said folded position and being capable of being manipulated so as to permit such folding, said toggle means comprise two elongated links having adjacent ends pivotally connected to one another and having remote ends, each of which is pivotally connected to one of said elongated members, said links being connected to said members and to one another so as to pass through an over-center position in which an outward force is exerted on said members during actuation of said toggle means for securing said parts against folding, said links are pivotally connected together and to said members by hinges having parallel axes which are parallel to the axes of said handle hinge means, and including leg means attached to each of said members so as to extend therefrom.

* * * * *